United States Patent [19]

Yogev

[11] Patent Number: 5,077,030

[45] Date of Patent: Dec. 31, 1991

[54] METHOD OF AND MEANS FOR PRODUCING POWER AND COOLING IN MANUFACTURING OF AMMONIA AND RELATED PRODUCTS

[75] Inventor: Amnon Yogev, Rehovot, Israel

[73] Assignee: Ormat Systems, Inc., Yavne, Israel

[21] Appl. No.: 380,721

[22] Filed: Jul. 12, 1989

Related U.S. Application Data

[63] Continuation of Ser. No. 143,231, Jan. 6, 1988, abandoned, which is a continuation of Ser. No. 840,741, Mar. 18, 1986, abandoned, which is a continuation of Ser. No. 604,519, Apr. 27, 1984, abandoned.

[51] Int. Cl.$^5$ .......................... C01C 1/26; C01C 1/04; F01R 25/06
[52] U.S. Cl. ..................................... 423/420; 423/359; 423/360; 423/659; 423/DIG. 11; 60/649; 60/673
[58] Field of Search ............... 423/522, 529, 359, 360, 423/361, 420, 659, DIG. 11; 60/649, 673

[56] References Cited

U.S. PATENT DOCUMENTS

| | | | |
|---|---|---|---|
| 323,583 | 8/1885 | Kendall | 423/DIG. 9 |
| 668,682 | 2/1901 | Henderson | 60/649 |
| 4,009,575 | 3/1977 | Hartman et al. | 60/673 |
| 4,197,281 | 4/1980 | Muenger et al. | 423/420 |
| 4,312,851 | 1/1982 | Isalski et al. | 423/359 |
| 4,335,088 | 6/1982 | Efimov et al. | 423/420 |
| 4,421,734 | 12/1983 | Norman | 423/539 |
| 4,469,665 | 9/1984 | Pinto | 423/359 |
| 4,479,925 | 10/1984 | Shires et al. | 423/359 |
| 4,485,629 | 12/1984 | LeGoff | 60/673 |

FOREIGN PATENT DOCUMENTS

| | | | |
|---|---|---|---|
| 534938 | 12/1956 | Canada | 423/529 |
| 45-17669 | 6/1970 | Japan | 60/673 |
| 54-58248 | 5/1979 | Japan | 60/673 |
| 54-160937 | 12/1979 | Japan | 60/649 |
| 55-148908 | 11/1980 | Japan | 60/673 |
| 55-148908 | 11/1980 | Japan | 60/673 |
| 190502 | 9/1937 | Switzerland | 60/673 |
| 13764 | of 1851 | United Kingdom | 60/673 |
| 29690 | of 1897 | United Kingdom | 60/673 |
| 350101 | 1/1924 | United Kingdom | 60/673 |
| 0294882 | 9/1929 | United Kingdom | 60/673 |
| 1389441 | 4/1975 | United Kingdom | 60/673 |

OTHER PUBLICATIONS

Olsen, John C., Unit Process and Principles of Chemical Engineering, D. Van Nostrand Co, Inc., NY, NY 1932, pp. 1-3.

Hosler, E. R. and Ghandeharioun, Saeed, "Vapor Pressure Data For Potassium Carbonate-Potassium Bicarbonate Solutions For Application to Multiuse Power Cycles", Intersociety Energy Conversion Engineering Conference, vol. 2 (1983), pp. 630-635.

Primary Examiner—Gary P. Straub
Attorney, Agent, or Firm—Sandler, Greenblum & Bernstein

[57] ABSTRACT

Modifications are made to the standard process for the manufacture of ammonia and related compounds, resulting in lower operating costs through reduced total energy consumption. In one aspect of the invention, this is achieved by directing ammonia gas through one feed line, and carbon dioxide gas and steam through another feed line, into a closed reaction chamber to form ammonium carbonate. The formation of this solid compound results in a reduced pressure in the chamber. This reduced pressure can be used to drive heat engines in the reactant feed lines. In another aspect of the invention, the cost of running the potassium carbonate loop while the rest of the system is down is reduced by constructing an alternate pathway along part of the loop. The carbon dioxide gas and water vapor formed by the heating of the potassium bicarbonate flow through a heat engine and are cooled. The cooled water vapor and carbon dioxide gas are then recycled. The reactant gases may be liquified and revaporized in the event of reactor shutdown, and heat-exchange means may be associated with the system to provide at least a portion of the heat of vaporization of the liquified reactants. The heat-exchange means can thus produce a refrigerating fluid as a result of the vaporization of the reactants.

4 Claims, 1 Drawing Sheet

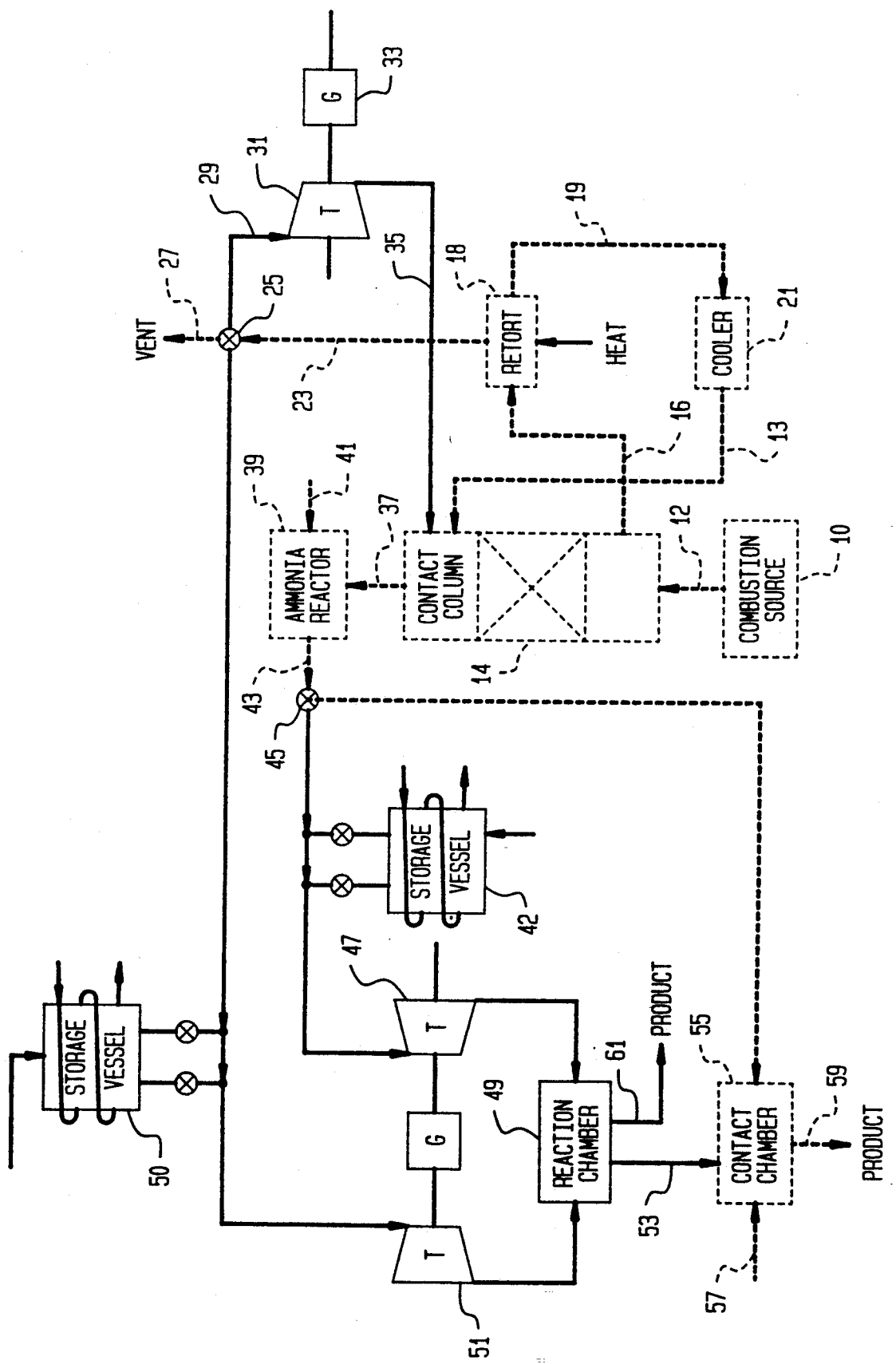

METHOD OF AND MEANS FOR PRODUCING POWER AND COOLING IN MANUFACTURING OF AMMONIA AND RELATED PRODUCTS

This application is a continuation of application Ser. No. 143,231, filed Jan. 6, 1988, which is a continuation of Ser. No. 840,741 filed Mar. 18, 1986, which is in turn a continuation of Ser. No. 604,519 filed Apr. 27, 1984, all now abandoned.

TECHNICAL FIELD

The invention relates to methods of and means for producing power and cooling in the manufacture of ammonia and related products, such as ammonium carbonate and ammonium sulfate.

BACKGROUND ART

The large-scale manufacture of ammonia and its derivative compounds has been performed since the early twentieth century according to a process developed by HABER and others.

The original process, substantially unmodified to the present day, begins with a fuel source, such as coke from bituminous coal or lignite. This fuel is blasted to incandescence and steam is passed through the fuel bed, eventually yielding a mixture of carbon dioxide and hydrogen gases.

The carbon dioxide must be separated from the hydrogen before the synthesis of ammonia can take place. This is accomplished by directing the gas mixture into a potassium carbonate/potassium bicarbonate loop.

The loop must be kept in constant operation, even when the rest of the ammonia plant is shut down. In the loop, the gaseous mixture of hydrogen and carbon dioxide is contacted with cold potassium carbonate aqueous solution. This results in the production of an aqueous potassium bicarbonate solution. Free hydrogen gas is removed and the potassium bicarbonate solution is then heated to approximately 130° C. to regenerate potassium carbonate by evolving carbon dioxide and water vapor. The carbon dioxide and water vapor are vented to the atmosphere. The hot potassium carbonate solution is cooled by means of a heat exchanger, and the cooled solution is recycled. The separated hydrogen gas is combined with a suitable source of nitrogen such that the ratio of hydrogen to nitrogen is approximately 3:1. The hydrogen and nitrogen enter a synthesis loop where they pass over a catalyst in a high-pressure ammonia converter where the ammonia is formed.

Additional useful compounds can also be produced from the ammonia. For example, ammonium sulfate produced by treating the ammonia with sulfuric acid.

Should the potassium carbonate loop in the ammonia manufacture process have to be shut down because of trouble upstream or downstream of the loop, or because of lack of fuel or other material, considerable time and expense are spent in restoring the potassium carbonate cycle to normal operation.

Moreover, though ammonia and its chemical derivatives are very useful chemical compounds, a great deal of energy has to be expended in their manufacture. It would thus be desirable to provide a technique for reducing the energy needed to manufacture a given quantity of ammonia, as well as minimizing the amount of energy wasted when cycling the potassium carbonate loop when the rest of the system is shut down.

DISCLOSURE OF THE INVENTION

Generally speaking, the process of the invention is unique in that rather than relying upon the normal contraction which occurs when a gas is cooled to condense it, the instant invention relies instead on chemical reaction kinetics to provide a final product which exerts a vacuum on its feedstreams. Thus, the invention is applicable to reactions wherein the temperature of the final product is not only lower than the reactants, as might be the case in a condensation phase change, but also in situations where the final product is at the same or even higher temperatures than the reactants. This principle forms one important aspect of the invention which will be described with reference to the annexed FIGURE. Although the FIGURE is directed to a complete ammonia and ammonium sulfate production flow chart, the inventive process and apparatus include a number of distinct aspects which will be separately discussed below.

According to a first aspect of the invention, ammonium sulfate is formed by first reacting ammonia with carbon dioxide and water vapor in a reactor to form an ammonium carbonate solution (water vapor being provided in excess over the stoichiometric amount, so as to ensure that the resulting ammonium carbonate solution is a free flowing slurry), and subsequently reacting the ammonium carbonate solution with sulfuric acid to form ammonium sulfate. While it has been conventional to react ammonia directly with sulfuric acid to form ammonium sulfate in the prior art, it has now been found that by forming the ammonium carbonate intermediate the process of ammonia manufacture can be manipulated, such that energy can be removed from the system.

Thus, if at least one of the reactants which form the ammonium carbonate is passed through a heat engine upstream of the reactor prior to being exhausted into a closed reactor, the formation of the solid ammonium carbonate (in solution) in the reactor creates a vacuum in the reactor resulting from the decrease in volume between the reactants and the products, which results in a pressure drop across the heat engine. The reaction chamber thus acts as a condenser for the exhaust of the heat engine which can be used to generate electrical power, for example.

The corresponding apparatus for the manufacture of ammonium sulfate includes sources of ammonia, carbon dioxide and water vapor, as well as means for feeding the ammonia, carbon dioxide and water vapor into a reaction chamber wherein the ammonium carbonate is ultimately formed. A source of sulfuric acid is additionally provided and the apparatus includes means for reacting the ammonium carbonate with the sulfuric acid to form ammonium sulfate. Again, in the inventive apparatus, a heat engine is connected between at least one of the reactant sources and the reaction chamber so as to take advantage of the pressure drop which occurs in the reaction chamber as the result of the formation of the ammonium carbonate.

According to another aspect of the invention, the potassium carbonate/bicarbonate loop which is conventionally used for separating the useful hydrogen out of flue gases in the manufacture of ammonia is modified such that the separated carbon dioxide and water vapor, which might otherwise be vented, are used to form ammonium carbonate. The advantage of this technique is that by saving and using the carbon dioxide in the system, the heat energy of the carbon dioxide, which is absorbed during heating of the potassium bicarbonate, can be at least partially recovered by passing the carbon dioxide through a heat engine prior to passage into the reaction chamber. Using this technique the pressure drop which occurs in the pressure chamber as a result of the formation of the ammonium carbonate results in a pressure drop across the heat engine which can drive the engine to recover energy. The ammonium carbonate which is formed may then be reacted with sulfuric acid to form ammonium sulfate. Quite obviously, a second heat engine may be positioned in the ammonia feed line to also take advantage of the reduced pressure in the reaction chamber.

In another aspect of the present invention, the reaction products of a process for the manufacture of ammonia and its by-products are thus used as working fluids in the production of power. According to yet another aspect of the invention, when ammonium sulfate is not needed, such as when the material is in oversupply or when the available ammonia supply exceeds that needed for the manufacture of ammonium sulfate, the available ammonia supply may be reacted with a water vapor-carbon dioxide gaseous mixture to accumulate the ammonia in the form of ammonium carbonate, which may itself be stored. Again, energy may be generated by passing each of the streams through heat engines.

Alternatively, each of the gas streams may be pressure-liquified, and stored in vessels at room temperature. When one desires to utilize the condensed liquids, the liquids can be simultaneously expanded through heat engines into an ammonium carbonate reaction chamber. In the process of gasification, the storage vessels are cooled, and can be used to cool a refrigerant flowing through a heat-exchange system in physical contact with the walls of the vessels. The gasification process can be controlled to occur isothermally. The energy of expansion can thus be considered to be the difference in free energy between the free energies of the reactants (i.e., water vapor, carbon dioxide, and ammonia) and that of the product, ammonium carbonate.

In yet another aspect of the invention, Applicant has developed a technique for continuously operating the potassium carbonate/bicarbonate loop, and more specifically the retort heater used to heat the potassium bicarbonate solution continuously, even in the event of shutdown ahead of or downstream of the loop. This is important, since in the event of system upset, e.g., in the event the heaters and contact chambers of the loop are shut down, start-up is very costly and very time-consuming. Thus, Applicant has found a technique in which, during upset, the loop is operated continuously by recycling the carbon dioxide and water vapor, which would normally have been vented upon leaving the potassium bicarbonate solution heater, and recovering the heat energy in this recycled stream, thus reducing the cost of operating the loop during this stand-by condition. Thus, according to the invention, the carbon dioxide gas, hydrogen gas and water vapor are first contacted with a potassium carbonate solution to form potassium bicarbonate solution. Free hydrogen gas is separated from the potassium bicarbonate solution and the potassium bicarbonate solution is heated to regenerate potassium carbonate solution while liberating carbon dioxide and water vapor. The potassium carbonate solution is cooled in preparation of reuse and the liberated carbon dioxide and water vapor are cooled by passing the carbon dioxide and water vapor through a heat engine. The water vapor is provided in excess to the stoichiometric amount required in the reaction so that a free flowing slurry is formed and the heat engine blades do not become encrusted with material. The cooled carbon dioxide and water vapor are then contacted with the cooled potassium carbonate solution and the process can be continued as long as desired while nevertheless recovering energy which would otherwise be lost if the carbon dioxide stream were to be vented to the atmosphere.

In one of its broader aspects, the invention can be characterized as setting forth a process of forming a product in a reaction chamber from two or more reactants with the product having a lower pressure in the reaction chamber than the pressure of each of the reactants in the reactant feed lines. This results from the reduction in volume of the products of the reaction relative to the reactants. Thus, upon entering the reaction chamber the reactants react and a vacuum is generated within the reaction chamber which results in a pressure drop across at least one heat engine which is positioned in at least one of the reactant lines. It should be noted that, depending on the reactants used and the reaction conditions, it is possible to pass all of the reactants through a single line, such as when the reaction requires a catalyst, or to segregate the reactants with heat engines being positioned in some or all of the segregated reactant lines. The reaction chamber may be cooled by a heat exchanger (not shown) for the purpose of removing the heat which is formed in exothermic reactions within the reaction chamber.

According to this broad aspect of the invention, the reactants may be gases with the reaction products being gaseous, solid, liquid or mixtures thereof. As described specifically in the drawings, the reactants are ammonia, water vapor and carbon dioxide, with the reaction product being ambonium carbonate in solution.

At least four types of reactions may be contemplated for purposes of achieving the process of the invention relating to the generation fo energy by using a chemical reaction as a means for creating and/or increasing the pressure head of a system e.g. (from report sources), (1) Reactions involving a gas and a liquid: from separate sources.

e.g., $2NH_3 + H_2SO_4 \rightarrow (NH_4)_2SO_4$ 

(2) Reactions involving different gases which come from the same source (a closed loop system):

e.g., $H_2O + CO_2 + K_2CO_3 \rightleftharpoons 2KHCO_3$, and 

(3) Reactions which involve different gases which come from different sources, i.e., an open loop:

e.g., $2NH_3 + CO_2 + H_2O \rightarrow (NH_4)_2CO_3$ 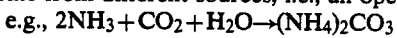

(4) Reactions which involve a gas and a solid:

e.g., $CO_2 + 2NaOH \rightarrow Na_2CO_3 + H_2O$ 

The following comments, in tabular form, apply to the above reactions:

| Reaction No. | Comment |
| --- | --- |
| 1 | $NH_4SO_4$ is a solid. If the $H_2SO_4$ is in water solution, the product is a solution. |
| 2 | $K_2CO_3$ and $KHCO_3$ are both solid salts. If $H_2O$ is in excess then they are in solution (i.e., liquid) form. |
| 3 | $(NH_4)_2 CO_3$ is solid. Excess water will provide a solution. |

-continued

| Reaction No. | Comment |
|---|---|
| 4 | NaOH and $Na_2CO_3$ are solids. |

By way of example, the technique of the invention may be used to generate a vacuum which may in turn be used to drive a turbine in connection with the following reactions in closed loop cycles:

1) $2NH_3(g) + H_2O(g) + SO_3(g) \rightleftharpoons (NH_4)_2SO_4$ high pressure at 100° C. low pressure at 200° C.
2) $H_2O(l) + CaO(s) \rightleftharpoons Ca(OH)_2(l)$
3) $NH_3 + H_2O + CO_2 \rightleftharpoons (NH_4)HCO_3$
4) $2NH_3 + H_2S \rightleftharpoons (NH_4)HCO_3$
5) $2NH_2CH_3 + H_2O + CO_2 \rightleftharpoons (NH_3CH_3)_2CO_3$
6) $2NH(CH_3)_2 + H_2O + CO_2 \rightleftharpoons (NH_2(CH_3)_2)_2CO_3$
7) $2N(CH_3)_3 + CO_2 + H_2O \rightleftharpoons (NH(CH_3)_3)_2CO_3$ The various compounds are heated until vaporization and decomposition into their components which are then expanded through a turbine, and reacted in a reaction chamber so as to re-form the original compound.

The invention extends to the inventive apparatus which is used to form a product in a reaction chamber from at least two reactants, the product having a lower pressure in the reaction chamber than the inlet pressure of each of the reactants. In this embodiment at least one line connects a source of each of the reactants to the reaction chamber and at least one heat engine is positioned in at least one of the lines whereby upon reaction of the reactants in the chamber a pressure drop occurs across the heat engine due to the reduced pressure in the reaction chamber.

As the product is formed in the reaction chamber, with the resultant lowering of pressure, the reactants are expanded through the feed lines into the reaction chamber. This expansion can occur under either isothermal or nonisothermal conditions. Any of the following three situations can exist:

1) $T_{in} = T$ reaction chamber
2) $T_{in} > T$ reaction chamber
3) $T_{in} < T$ reaction chamber where $T_{in}$ is the inlet temperature of the vapors (before expansion) and T reaction chamber is the temperature of the reactor.

While continuous reference is made to the term "heat engine" throughout the application, it is to be understood that the term is used to include all manner of devices which can be used to extract the energy from the flowing reactants and may, for example, constitute a turbine which is connected to an electrical generator.

BRIEF DESCRIPTION OF THE DRAWINGS

An embodiment of the invention is described in the accompanying FIGURE, with reference to a flow diagram of the process for the manufacture of ammonia and related compounds.

DETAILED DESCRIPTION OF THE INVENTION

Referring now to the Figure, the conventional process steps are shown in dashed lines, while the steps of the invention are illustrated in solid lines. Reference numeral 10 refers to a combustion source, such as a coke furnace which provides a flue gas stream 12 of gaseous hydrogen and carbon dioxide. This stream is contacted with an aqueous potassium carbonate solution stream 13 at a temperature of about 30° C. in a gas-liquid contact column 14. The potassium carbonate solution reacts with carbon dioxide in the stream to form potassium bicarbonate. The potassium bicarbonate solution 16 is then directed into a retort 18, where it is heated to approximately 130° C., thus regenerating the potassium carbonate solution 19, which is then cooled in cooler 21 to a temperature of about 30° C. After being cooled, the potassium carbonate solution is recycled to the top of the contact column 14, wherein it removes carbon dioxide from the input flue stream.

Along with the regeneration of potassium carbonate solution in retort 18, water vapor and carbon dioxide gas stream 23 at a temperature of about 130° C. are formed. This stream is directed toward a valve 25, which can either vent the gases into the atmosphere (as in conventional techniques) through a vent 27, or direct the carbon dioxide and water vapor through line 29 to drive a heat engine including a turbine 31 connected to generator 33. Water vapor is used in excess over the stoichiometric amount required in the reaction so that a slurry is formed and the blades of the turbine do not become encrusted with material. The exiting carbon dioxide and water vapor stream 35 which has been cooled as a result of the work performed can be returned to the top of the contact column 14 to react with the potassium carbonate solution.

As a result of this configuration, a carbon dioxide stream can be continuously cycled through the system by adjusting valve 25 to divert exiting carbon dioxide through heat engine 31. Using this technique, retort 18 can be operated even when the carbon dioxide being generated is not used or when the input flue stream 12 has been discontinued. Nevertheless, it is an advantage of the invention that the heat added to the carbon dioxide stream in the retort is at least partially recovered in the form of energy generated by heat engine 31.

Free hydrogen 37 leaving contact column 14 is fed into reactor 39, which is also fed with a nitrogen stream 41 such that the ratio of hydrogen to nitrogen in reactor 39 is approximately 3:1, wherein gaseous ammonia 43 is formed. A conventional ammonia reactor may be used and operated conventionally for this purpose.

Ammonia leaving reactor 39 is directed by a valve 45 along one or both of two different streams. Thus, the formed ammonia can be used directly or be reacted, as in conventional techniques, with sulfuric acid to form ammonium sulfate. This reaction is known, and is shown in dashed lines.

However, according to the invention, rather than reacting the ammonia directly with sulfuric acid, the ammonia is first directed by valve 45 through turbine 47 and into reaction chamber 49. In this embodiment, carbon dioxide and water vapor which might otherwise have been vented by vent stream 27 are diverted through turbine 51 and into reaction chamber 49, where the carbon dioxide and water vapor are reacted with the ammonia to form aqueous ammonium carbonate. It is the ammonium carbonate solution stream 53 which is then fed into contact chamber 55, where it is contacted with sulfuric acid 57 to form ammonium sulfate stream 59.

By first forming ammonium carbonate as a reaction intermediate prior to forming the ultimate ammonium sulfate stream, which is desired, it is possible to achieve a very desirable energy savings. Since the two gases reacting in chamber 49 form a solid (in solution) having a substantially reduced specific volume as compared to the two reaction gases, there is a reduced pressure or vacuum exerted by the reaction chamber relative to the line pressures of the reactants, which results in a pressure drop across both turbines 47 and 51. This pressure drop drives each of the turbines, which generate useful energy. Quite obviously, two turbines need not necessarily be used and it is possible, for example, to use only a single turbine positioned in one line.

Chamber 49 is intended to be closed to the atmosphere such that the vacuum exerted upon reaction of the reactants forms a pressure drop across the heat engines. The solution or slurry formed in the reaction chamber may be removed by any conventional means from stream 61, while maintaining the reduced pressure within the reaction chamber. Sufficient water vapor (in excess of the stoichiometric amount) is used to ensure that a free flowing slurry is formed.

The solution or slurry formed in the reaction chamber may also be treated, by means known to those skilled in the art, to regenerate the $NH_3$, $CO_2$ and water vapor, which can then be recycled through the chamber 49 to drive the turbines and form ammonium carbonate.

According to yet another aspect of the invention, the system may be modified to allow for the storage of the gases which drive turbines 47 and 51. To do this, vessels 42 and 50 are provided for storing the gases at ambient temperature under pressures sufficient to liquify the gasses. Pressurization means and lines are associated with each of the vessels for this purpose. The valves necessary for diverting the streams into the vessels are schematically illustrated. Storage of the gases may become necessary, as where an oversupply of the products occurs. When the liquified gases are to be regasified, the valves are opened, and the vessels are depresurized to permit the gasification of the liquids. According to a preferred embodiment, the vessels may be provided with heat-exchange means associated with the walls of the vessels. The heat-exchange means may contain a heat-exchange fluid, such as a liquid, adapted to provide at least a portion of the heat necessary for gasification. The fluid is thus cooled, and may be used as a refrigerating fluid.

The principle of the invention is likewise applicable in producing ammonium carbonate solution 61 the desired end product. The ammonium carbonate may be stored and used, or subsequently converted to ammonium sulfate by the process of the invention, or any other technique.

It is thus seen that the system of the invention provides a number of significant advantages over prior processes of forming ammonia, in that the potassium carbonate/potassium bicarbonate loop can be operated continuously, so as to avoid shutting down the retort in the event of system upset. Furthermore, this loop can be operated continuously while not wasting the heat energy inputted to the retort, since the liberated carbon dioxide drives a turbine, which cools the carbon dioxide and recovers useful energy.

Additionally, the system of the invention improves the efficiency of producing ammonia sulfate by first forming a reaction intermediate which creates a pressure drop which can be used to drive at least one turbine, and generate useful energy. The reaction products of the ammonia production process are thus used as working fluids in the generation of power.

For purposes of simplicity, the process of the invention has been described with reference to a complete system, beginning with the initial reactants, and ultimately forming the desired end products (ammonia, ammonium carbonate, or ammonium sulfate). It is to be understood, however, that the invention is not limited to the process as a whole, and extends to the various individual inventive aspects when performed individually.

Furthermore, although described with reference to a particular production scheme, it is clear that the inventive process steps will find application in connection with other flow schemes for providing a wide variety of compounds. To the extent that the inventive principles find other applications in other processes, the use of these principles is deemed to be included within the scope of the invention to the extent to which these principles fall within the scope of the claims.

What is claimed is:

1. A process for the manufacture of ammonia and ammonium carbonate comprising the steps of:
   a) passing a furnace flue gas comprising hydrogen and carbon dioxide into contact with cooled potassium carbonate to form potassium bicarbonate solution and free hydrogen;
   b) separating and reacting said free hydrogen with nitrogen to from ammonia;
   c) removing at least a portion of said potassium bicarbonate solution and heating said removed potassium bicarbonate solution for regenerating potassium carbonate solution while liberating heated carbon dioxide and water vapor;
   d) recyling and cooling said potassium carbonate solution of step c) for use according to step a);
   e) reacting said ammonia of step b) and carbon dioxide and water vapor of step c) in a reaction chamber to form ammonium carbonate, said water vapor being in stochiometric excess for forming a flowable slurry of ammonium carbonate in said chamber;
   f) passing at least a portion of said ammonia of step b) through a turbine prior to the reaction of step e) whereby a pressure drop occurs across said turbine as a result of said reaction; and
   g) removing slurry from said reaction chamber while maintaining a reduced pressure therein.

2. A process according to claim 1 further comprising the steps of passing at least a portion of said carbon dioxide and water vapor of step (c) through a further heat engine prior to the reaction of step (e).

3. A process for the manufacture of ammonia and ammonium carbonate comprising the steps of:
   a) passing a furnace flue gas comprising hydrogen and carbon dioxide into contact with cooled potassium carbonate to form potassium bicarbonate solution and free hydrogen;
   b) separating and reacting said free hydrogen with nitrogen to from gaseous ammonia;
   c) removing at least a portion of said potassium bicarbonate solution and heating the same for regenerating potassium carbonate solution while liberating heated carbon dioxide and water vapor;
   d) recyling and cooling said potassium carbonate solution of step c) for use according to step a);
   e) liquefying the gaseous ammonia of step b) and at least the carbon dioxide of step c) and temporarily storing the same in separate vessels;
   f) subsequently gasifying the store liquids to from gaseous ammonia and carbon dioxide;

g) reacting the gasified ammonia with the gasified carbon dioxide of step f) and with water vapor in a reaction chamber to form ammonium carbonate, said water vapor being in stochiometric excess for forming a slurry of ammonium carbonate in said chamber; and h) passing at least a portion of said ammonia of step f) through a turbine prior to the reaction of step g) whereby a pressure drop occurs across said turbine as a result of said reaction.

4. A process according to claim 3 further including the step of passing at least a portion of said gaseous carbon dioxide and water vapor of step (f) through a further heat engine prior to the reaction of step (g).

* * * * *